(12) United States Patent
Magario et al.

(10) Patent No.: US 7,438,970 B2
(45) Date of Patent: Oct. 21, 2008

(54) CARBON FIBER COMPOSITE MATERIAL AND METHOD OF PRODUCING THE SAME, CARBON FIBER-METAL COMPOSITE MATERIAL AND METHOD OF PRODUCING THE SAME, AND CARBON FIBER-NONMETAL COMPOSITE MATERIAL AND METHOD OF PRODUCING THE SAME

(75) Inventors: Akira Magario, Nagano-ken (JP); Toru Noguchi, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 509 days.

(21) Appl. No.: 11/134,292

(22) Filed: May 23, 2005

(65) Prior Publication Data

US 2006/0062986 A1 Mar. 23, 2006

(30) Foreign Application Priority Data

May 24, 2004 (JP) ............................. 2004-153428

(51) Int. Cl.
*B32B 13/02* (2006.01)

(52) U.S. Cl. ................. 428/297.4; 428/299.1; 524/496; 524/495

(58) Field of Classification Search .............. 428/297.4, 428/229.1, 367, 408; 423/447.1; 524/496, 524/495

See application file for complete search history.

(56) References Cited

U.S. PATENT DOCUMENTS

| | | | |
|---|---|---|---|
| 3,788,935 A | 1/1974 | Shyne et al. | |
| 5,458,181 A | 10/1995 | Corbett et al. | |
| 5,529,620 A | 6/1996 | Corbett et al. | |
| 5,877,100 A * | 3/1999 | Smith et al. | ..................... 501/12 |
| 6,734,262 B2 * | 5/2004 | Patel | ........................... 525/419 |
| 6,994,907 B2 * | 2/2006 | Resasco et al. | ............. 428/367 |
| 7,001,556 B1 * | 2/2006 | Shambaugh | ............. 264/210.6 |
| 7,019,062 B2 * | 3/2006 | van Beek et al. | ............. 524/425 |
| 7,153,903 B1 * | 12/2006 | Barraza et al. | ............. 524/847 |
| 7,309,727 B2 * | 12/2007 | Elkovitch et al. | ........... 524/449 |
| 2004/0241440 A1 | 12/2004 | Noguchi et al. | |
| 2005/0075443 A1 | 4/2005 | Noguchi et al. | |
| 2006/0016522 A1 | 1/2006 | Noguchi et al. | |
| 2006/0062986 A1 * | 3/2006 | Magario et al. | .......... 428/292.1 |

(Continued)

FOREIGN PATENT DOCUMENTS

| | | |
|---|---|---|
| FR | 2655036 A1 | 5/1991 |
| JP | A-02-212370 | 8/1990 |
| JP | A-02-310329 | 12/1990 |
| JP | A 10-183269 | 7/1998 |
| JP | A-2003-012939 | 1/2003 |
| JP | A 2003-239171 | 8/2003 |
| JP | A-2005-082614 | 3/2005 |
| JP | A-2005-255788 | 9/2005 |
| WO | WO 91/00932 | 1/1991 |

OTHER PUBLICATIONS

Noguchi et al., "Structure and Properties for Carbon Nanofiber/Elastomer Nanocomposites," Sep. 10, 2003, 52d SPSJ Symposium on Macromolecules, pp. 1785-1786, (with English-language translation of relevant portions).

(Continued)

*Primary Examiner*—N Edwards
(74) *Attorney, Agent, or Firm*—Oliff & Berridge, PLC

(57) ABSTRACT

A carbon fiber composite material including: a thermoplastic resin; carbon nanofibers dispersed in the thermoplastic resin; and dispersing particles which promote dispersion of the carbon nanofibers in the thermoplastic resin.

37 Claims, 2 Drawing Sheets

PARTIALLY ENLARGED VIEW

U.S. PATENT DOCUMENTS

2006/0079627 A1    4/2006    Noguchi et al.
2007/0100058 A1*    5/2007    Noguchi et al. ............. 524/496
2007/0112124 A1*    5/2007    Noguchi et al. ............. 524/495
2008/0132635 A1*    6/2008    Noguchi et al. ............. 524/495

OTHER PUBLICATIONS

Magario et al., "Structure and Properties for Carbon Nanofiber/Alminium Nanocomposites," Oct. 11, 2003, 133d Collected Abstracts of The 2004 Autumn Meeting of The Japan Institute of Metals, pp. 566, (with English-language translation of relevant portions).

Noguchi et al., "Dynamic Properties for CNT/Al Nanocomposites," Mar. 30, 2004, 134th Collected Abstracts of the 2004 Spring Meeting of The Japan Institute of Metals, pp. 353, (with English-language translation of relevant portions).

Magario et al., "Structure and Thermal Properties for CNT/Al Nanocomposites," Mar. 30, 2004, 134th Collected Abstracts of the 2004 Spring Meeting of The Japan Institute of Metals, pp. 353, (with English-language translation of relevant portions).

Noguchi et al., "Preparation and Properties of Aluminum Nanocomposites by Matrix Substitution of Carbon Nanotube/Elastomer Composites," May 20, 2004, 71st The Society of Rubber Industry, Japan Annual Meeting, pp. 30, (with English-language translation of relevant portions).

Noguchi et al., "Development of Carbon Nanotubes/Aluminum Composites and Expectation as Lightweight Member," Aug. 1, 2004, Engineering Materials, vol. 52, No. 8, (with English-language translation of relevant portions).

Noguchi et al., "Thermal Expansion of CNT/Al Nanocomposites," Sep. 28, 2004, 135th Collected Abstracts of the 2004 Autumn Meeting of The Japan Institute of Metals, pp. 569, (with English-language translation of relevant portions).

Inukai et al., "Preparation and Properties of Carbon Nanotube/Styrene-based Thermoplastic Elastomer Nanocomposites," Oct. 28, 2004, 13th SPSJ Polymer Material Forum, pp. 181, (with English-language translation of relevant portions).

* cited by examiner

PARTIALLY ENLARGED VIEW

ABON FIBER COMPOSITE MATERIAL
AND METHOD OF PRODUCING THE SAME,
CARBON FIBER-METAL COMPOSITE
MATERIAL AND METHOD OF PRODUCING
THE SAME, AND CARBON
FIBER-NONMETAL COMPOSITE MATERIAL
AND METHOD OF PRODUCING THE SAME

Japanese Patent Application No. 2004-153428, filed on May 24, 2004, is hereby incorporated by reference in its entirety.

BACKGROUND OF THE INVENTION

The present invention relates to a carbon fiber composite material and a method of producing the same, a carbon fiber-metal composite material and a method of producing the same, and a carbon fiber-nonmetal composite material and a method of producing the same.

In recent years, a composite material using carbon nanofibers as disclosed in Japanese Patent Laid-open No. 2003-239171 has attracted attention. Such a composite material is expected to exhibit improved mechanical strength and the like due to inclusion of the carbon nanofibers.

As a casting method for a metal composite material, Japanese Patent Laid-open No. 10-183269 proposes a casting method which causes magnesium vapor to permeate and become dispersed in a porous formed product formed of oxide ceramics while introducing nitrogen gas to cause a molten metal to permeate the porous formed product.

However, since the carbon nanofibers have strong aggregating properties, it is very difficult to uniformly disperse the carbon nanofibers in a matrix of a composite material. Therefore, it is difficult to obtain a carbon nanofiber composite material having desired properties. Moreover, expensive carbon nanofibers cannot be efficiently utilized.

Since the related-art casting method which causes a molten metal to permeate a porous formed product formed of oxide ceramics involves complicated processing, it is difficult to achieve production on an industrial scale.

SUMMARY

According to a first aspect of the invention, there is provided a carbon fiber composite material, comprising:
 a thermoplastic resin;
 carbon nanofibers dispersed in the thermoplastic resin; and
 dispersing particles which promote dispersion of the carbon nanofibers in the thermoplastic resin.

According to a second aspect of the invention, there is provided a carbon fiber-metal composite material obtained by replacing the thermoplastic resin in the above-described carbon fiber composite material with a metal matrix material.

According to a third aspect of the invention, there is provided a carbon fiber-nonmetal composite material obtained by replacing the thermoplastic resin in the above-described carbon fiber composite material with a nonmetal matrix material.

According to a fourth aspect of the invention, there is provided a method of producing a carbon fiber composite material, the method comprising:
 (a) mixing a thermoplastic resin and dispersing particles which promote dispersion of carbon nanofibers in the thermoplastic resin; and
 (b) mixing the carbon nanofibers into the thermoplastic resin including the dispersing particles and dispersing the carbon nanofibers by applying a shear force.

According to a fifth aspect of the invention, there is provided a method of producing a carbon fiber-metal composite material, the method comprising:
 (c-1) replacing the thermoplastic resin in the carbon fiber composite material obtained by the above-described method of producing a carbon fiber composite material with a metal matrix material.

According to a sixth aspect of the invention, there is provided a method of producing a carbon fiber-nonmetal composite material, the method comprising:
 (c-2) replacing the thermoplastic resin in the carbon fiber composite material obtained by the above-described method of producing a carbon fiber composite material with a nonmetal matrix material.

According to a seventh aspect of the invention, there is provided a carbon fiber composite material formed by the above-described method of producing a carbon fiber composite material.

According to an eighth aspect of the invention, there is provided a carbon fiber-metal composite material formed by the above-described method of producing a carbon fiber-metal composite material.

According to a ninth aspect of the invention, there is provided a carbon fiber-nonmetal composite material formed by the above-described method of producing a carbon fiber-nonmetal composite material.

DETAILED DESCRIPTION OF THE EMBODIMENT

Figure 1:
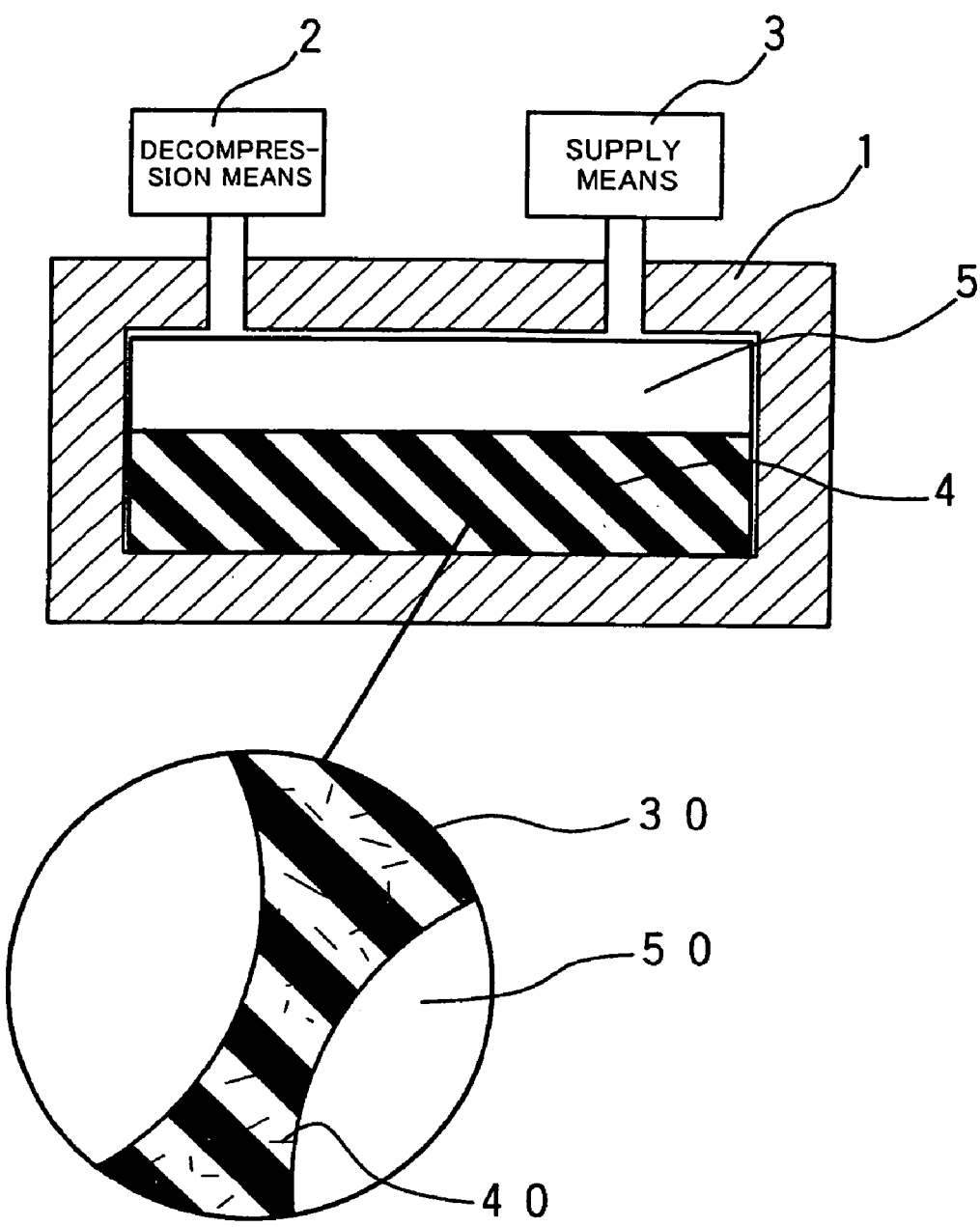
FIG. 1 is a schematic diagram of a device for producing a carbon fiber-metal composite material using a pressureless permeation method.

The invention may provide a carbon fiber composite material in which carbon nanofibers are uniformly dispersed, and a method of producing the same. The invention may also provide a carbon fiber-metal composite material in which carbon nanofibers are uniformly dispersed, and a method of producing the same. The invention may further provide a carbon fiber-nonmetal composite material in which carbon nanofibers are uniformly dispersed, and a method of producing the same.

According to one embodiment of the invention, there is provided a carbon fiber composite material, comprising:
 a thermoplastic resin;
 carbon nanofibers dispersed in the thermoplastic resin; and
 dispersing particles which promote dispersion of the carbon nanofibers in the thermoplastic resin.

In the carbon fiber composite material in this embodiment, the carbon nanofibers are further uniformly dispersed in the thermoplastic resin as the matrix for the reasons described later. In particular, even carbon nanofibers with a diameter of about 30 nm or less or carbon nanofibers in the shape of a curved fiber, which are difficult to be dispersed, can be uniformly dispersed in the thermoplastic resin.

The thermoplastic resin in this embodiment is a generally-used plastic which exhibits plasticity upon heating and solidifies upon cooling, and excludes a rubber composition such as a thermoplastic elastomer. The carbon nanofibers are dispersed in the thermoplastic resin to only a small extent. However, according to the invention, the carbon nanofibers can be uniformly dispersed in the thermoplastic resin due to the effect of promoting dispersion of the carbon nanofibers using the dispersing particles such as metal particles or nonmetal particles.

In a carbon fiber-metal composite material or a carbon fiber-nonmetal composite material obtained by replacing the thermoplastic resin in the carbon fiber composite material according to this embodiment with a metal or nonmetal matrix material, the carbon nanofibers are uniformly dispersed due to the presence of the metal particles in the same manner as in the carbon fiber composite material.

According to one embodiment of the invention, there is provided a method of producing a carbon fiber composite material, the method comprising:

(a) mixing a thermoplastic resin and dispersing particles which promote dispersion of carbon nanofibers in the thermoplastic resin; and (b) mixing the carbon nanofibers into the thermoplastic resin including the dispersing particles and dispersing the carbon nanofibers by applying a shear force.

According to this embodiment, use of the thermoplastic resin including the dispersing particles causes turbulent flows of the thermoplastic resin to occur around the dispersing particles when dispersing the carbon nanofibers by applying a shear force. The dispersion of the carbon nanofibers is further promoted by these flows, whereby the carbon nanofibers are uniformly dispersed in the carbon fiber composite material of the invention. In particular, even carbon nanofibers with a diameter of about 30 nm or less or carbon nanofibers in the shape of a curved fiber, which are difficult to be dispersed, can be uniformly dispersed in the thermoplastic resin.

The step (b) of dispersing the carbon nanofibers in the thermoplastic resin by applying a shear force may be carried out by using (1) an open-roll method, (2) an internal mixing method, (3) a multi-screw extrusion kneading method, or the like.

According to one embodiment of the invention, there is provided a method of producing a carbon fiber-metal composite material, the method comprising:

(c-1) replacing the thermoplastic resin in the carbon fiber composite material with a metal matrix material.

According to one embodiment of the invention, there is provided a method of producing a carbon fiber-nonmetal composite material, the method comprising:

(c-2) replacing the thermoplastic resin in the carbon fiber composite material with a nonmetal matrix material.

In the step (c-1) or the step (c-2), (4) a powder forming method which includes powder forming (including powder metallurgy) the carbon fiber composite material, (5) a casting method which includes mixing the carbon fiber composite material into a molten metal or a molten nonmetal and casting the mixture in a die having a desired shape, (6) a permeation method which includes disposing a metal ingot or a nonmetal body above the carbon fiber composite material, heating the metal ingot or the nonmetal body to melt into a molten metal or a molten nonmetal and heating the carbon fiber composite material to vaporize the thermoplastic resin in the carbon fiber composite material, thereby causing the molten metal or the molten nonmetal to permeate the carbon fiber composite material to replace the thermoplastic resin with the molten metal or the molten nonmetal, or the like may be employed.

According to such a method of producing a carbon fiber-metal composite material or a carbon fiber-nonmetal composite material, a carbon fiber-metal composite material or a carbon fiber-nonmetal composite material in which the carbon nanofibers are uniformly dispersed due to the presence of the dispersing particles can be obtained by using the carbon fiber composite material in which the carbon nanofibers are uniformly dispersed.

As the matrix material used in the step (c-1) or the step (c-2), a material the same as the material for the dispersing particles may be employed.

In particular, since the permeation method (6) causes the molten metal or the molten nonmetal to permeate the carbon fiber composite material coming in contact with the molten metal or the molten nonmetal while thermally decomposing the thermoplastic resin, the thermoplastic resin is replaced with the metal or the nonmetal formed by solidification of the molten metal or the molten nonmetal in a state in which the carbon nanofibers are uniformly dispersed. In the carbon fiber composite material, the amount of the dispersing particles is 1 to 2,000 parts by weight, and preferably 20 to 1000 parts by weight for 100 parts by weight of the thermoplastic resin. If the amount of the dispersing particles is less than 1 part by weight, the dispersing effect is decreased. Moreover, since the permeation rate of the molten metal is decreased due to a small degree of a capillary phenomenon, it is difficult to employ such an amount from the viewpoint of productivity and cost. If the amount of the dispersing particles is 2,000 parts by weight or more, impregnation with the thermoplastic resin becomes difficult when producing a carbon fiber composite material.

Embodiments of the invention are described below in detail with reference to the drawings.

The thermoplastic resin preferably has characteristics such as high affinity to the carbon nanofibers, a certain molecular length, and flexibility. In the step of dispersing the carbon nanofibers in the thermoplastic resin by applying a shear force, it is preferable that the carbon nanofibers and the thermoplastic resin be mixed at as high a shear force as possible.

(A) Thermoplastic Resin

The thermoplastic resin has a molecular weight of preferably 10,000 to 1,000,000, and still more preferably 50,000 to 300,000. If the molecular weight of the thermoplastic resin is within this range, since the thermoplastic resin molecules are entangled and linked, the thermoplastic resin easily enters the space between the aggregated carbon nanofibers, whereby the effect of separating the carbon nanofibers is improved. If the molecular weight of the thermoplastic resin is less than 10,000, since the thermoplastic resin molecules cannot be sufficiently entangled, the effect of dispersing the carbon nanofibers is reduced even if a shear force is applied in the subsequent step. If the molecular weight of the thermoplastic resin is greater than 1,000,000, since the thermoplastic resin becomes too hard, the processing of the thermoplastic resin becomes difficult.

The thermoplastic resin preferably has a first-component spin-spin relaxation time ($T_2s$) at the temperature of the step (b) (e.g. 250° C. in the case of ABS resin) measured by a Hahn-echo method using a pulsed NMR technique of 100 to 50,000 µsec. If the thermoplastic resin has a first-component spin-spin relaxation time ($T_2s$) within the above range, the thermoplastic resin is flexible and has sufficiently high molecular mobility. Therefore, when mixing the thermoplastic resin and the carbon nanofibers, the thermoplastic resin can easily enter the space between the carbon nanofibers due to high molecular mobility. If the first-component spin-spin relaxation time ($T_2s$) is shorter than 100 µsec, the thermoplastic resin cannot have sufficient molecular mobility. If the first-component spin-spin relaxation time ($T_2s$) is longer than 50,000 μsec, since the thermoplastic resin tends to flow as a liquid, it becomes difficult to disperse the carbon nanofibers.

The spin-spin relaxation time obtained by the Hahn-echo method using the pulsed NMR technique is a measure which indicates the molecular mobility of a substance. In more detail, when measuring the spin-spin relaxation time of the thermoplastic resin by the Hahn-echo method using the pulsed NMR technique, a first component having a shorter spin-spin relaxation time (T2s) and a second component having a longer spin-spin relaxation time (T2l) are detected. The first-component spin-spin relaxation time (T2s) corresponds to a polymer component having low molecular mobility (backbone molecule), and the second-component spin-spin relaxation time (T2l) corresponds to a polymer component having comparatively high molecular mobility (component which is not restrained by a backbone molecular chain). The shorter the first-component spin-spin relaxation time, the lower the molecular mobility and the harder the thermoplastic resin. The longer the first first-component spin-spin relaxation time, the higher the molecular mobility and the softer the thermoplastic resin.

As the measurement method in the pulsed NMR technique, a solid-echo method, a Carr-Purcell-Meiboom-Gill (CPMG) method, or a 90° pulse method may be applied instead of the Hahn-echo method. However, since the carbon fiber composite material according to one embodiment of the invention has a medium spin-spin relaxation time (T2), the Hahn-echo method is most suitable. In general, the solid-echo method and the 90° pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

The thermoplastic resin preferably has a spin-lattice relaxation time (T1) at the temperature of the step (b) measured by the Hahn-echo method using the pulsed NMR technique of 10 to 5,000 msec. If the thermoplastic resin has a spin-lattice relaxation time (T1) within the above range, the thermoplastic resin is flexible and has sufficiently high molecular mobility. Therefore, when mixing the thermoplastic resin and the carbon nanofibers, the thermoplastic resin can easily enter the space between the carbon nanofibers due to high molecular motion. If the spin-lattice relaxation time (T1) is shorter than 10 msec, the thermoplastic resin cannot have sufficient molecular mobility. If the spin-lattice relaxation time (T1) is longer than 5,000 msec, since the thermoplastic resin tends to flow as a liquid, it becomes difficult to disperse the carbon nanofibers.

The spin-lattice relaxation time (T1) measured by the Hahn-echo method using the pulsed NMR technique is a measure which indicates the molecular mobility of a substance in the same manner as the spin-spin relaxation time (T2). In more detail, the shorter the spin-lattice relaxation time of the thermoplastic resin, the lower the molecular mobility and the harder the thermoplastic resin. The longer the spin-lattice relaxation time of the thermoplastic resin, the higher the molecular mobility and the softer the thermoplastic resin.

The carbon nanofiber generally has a structure in which the side surface is formed of a six-membered ring of carbon atoms and the end is closed by introduction of a five-membered ring. Since the carbon nanofiber has a forced structure, a defect tends to occur, whereby a radical or a functional group tends to be formed at the defect. In one embodiment of the invention, since the thermoplastic resin includes a polar group having high affinity to the radical of the carbon nanofiber in at least one of the main chain, side chain, and terminal chain, the thermoplastic resin and the carbon nanofiber can be bonded. This enables the carbon nanofibers to be easily dispersed by overcoming the aggregating force of the carbon nanofibers.

As the thermoplastic resin, a thermoplastic resin such as polyethylene, polypropylene, poly-4-methylpentene, polyvinyl chloride, polyvinylidene chloride, ABS resin, polystyrene, acrylonitrile styrene resin, methacrylic resin, polyvinyl alcohol, EVA, polyamide resin, polyacetal resin, polycarbonate resin, polyester resin, polytetrafluoroethylene, fluororesin, polyimide, or polyamideimide; or a mixture of these thermoplastic resins may be used.

(B) Dispersing Particle

The dispersing particles are mixed and dispersed in the thermoplastic resin in advance to promote dispersion of the carbon nanofibers in the thermoplastic resin when mixing the carbon nanofibers, thereby causing the carbon nanofibers to be further uniformly dispersed. As the dispersing particles, metal particles or nonmetal particles may be used.

As the metal particles, particles of a light metal such as aluminum and an aluminum alloy, magnesium and a magnesium alloy, or titanium and a titanium alloy may be used either individually or in combination of two or more.

As the nonmetal particles, particles of ceramics or glass such as alumina ($Al_2O_3$), zirconia ($ZrO_2$), or silicon nitride ($Si_3N_4$) may be used either individually or in combination of two or more.

The dispersing particles preferably have an average particle diameter greater than the average diameter of the carbon nanofibers used in order to promote dispersion of the carbon nanofibers. The average particle diameter of the dispersing particles is 500 μm or less, and preferably 1 to 300 μm. When using a pressureless permeation method in a casting step, the amount of the dispersing particles is 1 to 2,000 parts by weight, and preferably 20 to 1,000 parts by weight for 100 parts by weight of the thermoplastic resin. If the amount of the dispersing particles is less than 1 part by weight, the dispersing effect is decreased. Moreover, since the permeation rate of a molten metal or a molten nonmetal is decreased due to a small degree of capillary phenomenon, it is difficult to employ such an amount from the viewpoint of productivity and cost. If the amount of the dispersing particles is 2,000 parts by weight or more, impregnation with the thermoplastic resin becomes difficult when producing a carbon fiber composite material. The shape of the dispersing particles is not limited to spherical. The dispersing particles may be in the shape of a sheet or a scale insofar as turbulent flows occur around the dispersing particles during mixing.

When the metal particles are aluminum particles, oxides on the surfaces of the aluminum particles are reduced by radicals generated by thermal decomposition of the thermoplastic resin when causing an aluminum molten metal to permeate the carbon fiber composite material. This improves wettability between the aluminum particles and the aluminum molten metal, whereby the bonding force can be increased. Moreover, flows due to permeation of the aluminum molten metal cause the carbon nanofibers to enter the aluminum particles. The above-described preferable effects are obtained when the dispersing particles have oxides on the surface, such as aluminum particles.

(C) Carbon Nanofiber

The carbon nanofibers preferably have an average diameter of 0.5 to 500 nm. In order to increase the strength of the resulting carbon fiber composite material, the average diameter of the carbon nanofibers is still more preferably 0.5 to 30 nm. The carbon nanofibers may be in the shape of a linear fiber or a curved fiber.

The amount of the carbon nanofibers added is not particularly limited, and may be set depending on the application. The carbon fiber composite material in one embodiment of the invention may be used as a thermoplastic resin material or a raw material for a composite material containing a metal or nonmetal matrix material. In the case of using the carbon fiber composite material in one embodiment of the invention as a raw material for a composite material containing a metal or nonmetal matrix material, the carbon fiber composite material may contain the carbon nanofibers in an amount of 0.01 to 100 parts by weight for the thermoplastic resin. Such a raw material for a composite material containing a metal or nonmetal matrix material may be used as a masterbatch as a carbon nanofiber source when mixing the carbon nanofibers into the metal or nonmetal matrix material.

As examples of the carbon nanofibers, a carbon nanotube and the like can be given. The carbon nanotube has a single-layer structure in which a graphene sheet of a hexagonal carbon layer is closed in the shape of a cylinder, or a multi-layer structure in which the cylindrical structures are nested. Specifically, the carbon nanotube may be formed only of a single-layer structure or a multi-layer structure, or a single-layer structure and a multi-layer structure may be present in combination. A carbon material having a partial carbon nanotube structure may also be used. The carbon nanotube may be called a graphite fibril nanotube.

A single-layer carbon nanotube or a multi-layer carbon nanotube is produced to a desired size using an arc discharge method, a laser ablation method, a vapor-phase growth method, or the like.

In the arc discharge method, an arc is discharged between electrode materials made of carbon rods in an argon or hydrogen atmosphere at a pressure lower than atmospheric pressure to some extent to obtain a multi-layer carbon nanotube deposited on the cathode. When mixing a catalyst such as nickel/cobalt into the carbon rod and discharging an arc, a single-layer carbon nanotube is obtained from soot adhering to the inner side surface of a processing vessel.

In the laser ablation method, a target carbon surface into which a catalyst such as nickel/cobalt is mixed is irradiated with strong pulse laser light from a YAG laser in a noble gas (e.g. argon) to melt and vaporize the carbon surface to obtain a single-layer carbon nanotube.

In the vapor-phase growth method, a carbon nanotube is synthesized by thermally decomposing hydrocarbons such as benzene or toluene in a vapor phase. As specific examples of the vapor-phase growth method, a floating catalyst method, a zeolite-supported catalyst method, and the like can be given.

The carbon nanofibers may be provided with improved adhesion to and wettability with the thermoplastic resin by subjecting the carbon nanofibers to a surface treatment such as an ion-injection treatment, sputter-etching treatment, or plasma treatment before mixing the carbon nanofibers and the thermoplastic resin.

(D) Step (b) of Mixing Carbon Nanofibers into Thermoplastic Resin and Dispersing Carbon Nanofibers by Applying Shear Force An example using a multi-screw extrusion kneading method in one embodiment of the invention is described below as the steps (a) and (b) of mixing the metal particles and the carbon nanofibers into the thermoplastic resin.

The thermoplastic resin in the shape of a pellet is supplied to a first hopper of a twin-screw extruder, and is melted by a shear force caused by rotation of the twin screws. After the addition of the dispersing particles to the melted thermoplastic resin from a second hopper of the twin-screw extruder, the twin screws are rotated. This causes the thermoplastic resin to be mixed with the dispersing particles which promote dispersion of the carbon nanofibers in the thermoplastic resin (step (a)).

After the addition of the carbon nanofibers from a third hopper of the twin-screw extruder in which the thermoplastic resin and the dispersing particles are mixed, the twin screws are rotated to mix the carbon nanofibers into the thermoplastic resin containing the dispersing particles and to disperse the carbon nanofibers by applying a shear force (step (b)).

This causes a high shear force to be applied to the thermoplastic resin. The shear force causes the aggregated carbon nanofibers to be separated so that the carbon nanofibers are removed one by one and dispersed in the thermoplastic resin. The shear force applied by using the twin screws causes turbulent flows to occur around the dispersing particles dispersed in the thermoplastic resin. These complicated flows cause the carbon nanofibers to be further dispersed in the thermoplastic resin.

If the thermoplastic resin and the carbon nanofibers are mixed before mixing the dispersing particles, since the movement of the thermoplastic resin is restrained by the carbon nanofibers, it is difficult to mix the dispersing particles. Therefore, it is preferable to perform the step (a) of mixing the dispersing particles before adding the carbon nanofibers to the thermoplastic resin.

In the step (b), the thermoplastic resin and the carbon nanofibers are mixed at about the melting point of the thermoplastic resin used in order to obtain as high a shear force as possible. The carbon nanofibers can be uniformly dispersed in the thermoplastic resin by setting the interval between the twin screws to be greater than the average particle diameter of the dispersing particles.

Since the thermoplastic resin in one embodiment of the invention allows the carbon nanofibers to be easily dispersed due to the above-described characteristics such as the molecular configuration (molecular length) and molecular motion, a carbon fiber composite material exhibiting excellent dispersibility and dispersion stability (carbon nanofibers rarely reaggregate) can be obtained. In more detail, when mixing the thermoplastic resin and the carbon nanofibers, the thermoplastic resin having an appropriately long molecular length and high molecular mobility enters the space between the carbon nanofibers, whereby the polar groups of the plastic resin bond to the radicals of the carbon nanofibers. When a high shear force is applied to the mixture of the thermoplastic resin and the carbon nanofibers in this state, the carbon nanofibers are moved accompanying the movement of the thermoplastic resin, whereby the aggregated carbon nanofibers are separated and dispersed in the thermoplastic resin.

Since the dispersing particles are included in the thermoplastic resin in a predetermined amount, a shear force is also applied to separate the carbon nanofibers due to many complicated flows such as turbulent flows of the thermoplastic resin occurring around the dispersing particles. Therefore, even carbon nanofibers with a diameter of about 30 nm or less or carbon nanofibers in the shape of a curved fiber move in the flow direction of each thermoplastic resin molecule, whereby the carbon nanofibers are uniformly dispersed in the thermoplastic resin.

In the step of dispersing the carbon nanofibers in the thermoplastic resin by applying a shear force, an internal mixing method or an open-roll method may be used instead of the multi-screw extrusion kneading method. In other words, it suffices that a shear force sufficient to separate the aggregated carbon nanofibers be applied to the thermoplastic resin.

A carbon fiber composite material obtained by the step of mixing and dispersing the dispersing particles and the carbon nanofibers in the thermoplastic resin (mixing and dispersion step) may be formed into a desired shape by performing injection molding, compression molding, extrusion molding, or the like. The compression molding includes forming the carbon fiber composite material, in which the dispersing particles and the carbon nanofibers are dispersed, in a pressurized state for a predetermined time in a die having a desired shape and set at a predetermined temperature.

In the mixing and dispersing step of the thermoplastic resin and the carbon nanofibers, or in the subsequent step, a known compounding ingredient usually used when processing a thermoplastic resin may be added. As examples of the compounding ingredient, an antioxidant, release agent, pigment, plasticizer, antistatic agent, reinforcing agent, flame retardant, and the like can be given.

In the above-described embodiment, the steps (a) and (b) are performed using the same mixing method. However, the thermoplastic resin in the shape of a pellet and the dispersing particles may be dry-blended in the step (a), and the resulting mixture may be supplied to the multi-screw extruder in the step (b).

(E) Carbon Fiber Composite Material Obtained by Above-described Method

In the carbon fiber composite material in one embodiment of the invention, the carbon nanofibers are uniformly dispersed in the thermoplastic resin as a matrix. In other words, the thermoplastic resin is restrained by the carbon nanofibers. The mobility of the thermoplastic resin molecules restrained by the carbon nanofibers is reduced in comparison with the case where the thermoplastic resin molecules are not restrained by the carbon nanofibers. Therefore, the first-component spin-spin relaxation time ($T2s$), the second-component spin-spin relaxation time ($T2l$), and the spin-lattice relaxation time ($T1$) of the carbon fiber composite material according to one embodiment of the invention are shorter than those of a thermoplastic resin which does not include the carbon nanofibers. In particular, when mixing the carbon nanofibers into the thermoplastic resin including the dispersing particles, the second-component spin-spin relaxation time ($T2l$) becomes shorter than that of a thermoplastic resin including only the carbon nanofibers. The spin-lattice relaxation time ($T1$) of the carbon fiber composite material changes in proportion to the amount of the carbon nanofibers mixed.

The amount of second components (components which are not restrained by a backbone molecular chain) is considered to be decreased for the following reasons, in a state in which the thermoplastic resin molecules are restrained by the carbon nanofibers. Specifically, when the molecular mobility of the thermoplastic resin is decreased by the carbon nanofibers over the entire thermoplastic resin, since the amount of second components which cannot easily move is increased, the second components tend to behave in the same manner as the first components. Moreover, since the second components easily move, the second components tend to be adsorbed on the active sites of the carbon nanofibers. It is considered that these phenomena decrease the amount of second components. Therefore, the fraction (fl) of components having the second-component spin-spin relaxation time becomes smaller than that of a thermoplastic resin which does not include the carbon nanofibers. In particular, when mixing the carbon nanofibers into the thermoplastic resin including the dispersing particles, the fraction (fl) of components having the second-component spin-spin relaxation time is further reduced in comparison with a thermoplastic resin including only the carbon nanofibers.

Therefore, the carbon fiber composite material according to one embodiment of the invention preferably has values measured by the Hahn-echo method using the pulsed NMR technique within the following range.

Specifically, it is preferable that, in the carbon fiber composite material, the first-component spin-spin relaxation time ($T2s$) measured at 250° C. be 100 to 1,000 μsec, the second-component spin-spin relaxation time ($T2l$) be absent or less than 20,000 μsec, and the fraction (fnn) of components having the second-component spin-spin relaxation time be less than 0.2.

The spin-lattice relaxation time ($T1$) measured by the Hahn-echo method using the pulsed NMR technique is a measure which indicates the molecular mobility of a substance in the same manner as the spin-spin relaxation time ($T2$). In more detail, the shorter the spin-lattice relaxation time of the thermoplastic resin, the lower the molecular mobility and the harder the thermoplastic resin. The longer the spin-lattice relaxation time of the thermoplastic resin, the higher the molecular mobility and the softer the thermoplastic resin.

The carbon fiber composite material according to one embodiment of the invention preferably has a flow temperature, determined by temperature dependence measurement of dynamic viscoelasticity, 20° C. or more higher than the flow temperature of the raw material thermoplastic resin. In the carbon fiber composite material in one embodiment of the invention, the dispersing particles and the carbon nanofibers are uniformly dispersed in the thermoplastic resin. In other words, the thermoplastic resin is restrained by the carbon nanofibers as described above. In this state, the thermoplastic resin exhibits molecular motion smaller than that of a thermoplastic resin which does not include the carbon nanofibers to exhibit decreased flowability. The carbon fiber composite material in one embodiment of the invention having such flow temperature characteristics shows a small temperature dependence of dynamic viscoelasticity to exhibit excellent thermal resistance.

The carbon fiber composite material in one embodiment of the invention may be used as a thermoplastic resin material or a raw material for a metal or nonmetal composite material, as described above. The carbon nanofibers are generally entangled and dispersed in a medium to only a small extent. However, when using the carbon fiber composite material in one embodiment of the invention as a raw material for a metal composite material, since the carbon nanofibers exist in the thermoplastic resin in a dispersed state, the carbon nanofibers can be easily dispersed in a medium by replacing the raw material with a metal or a nonmetal matrix material.

(F) Step (c) of Producing Carbon Fiber-Metal Composite Material or Carbon Fiber-nonmetal Composite Material A method of producing a carbon fiber-metal composite material in one embodiment of the invention includes (c-1) replacing the thermoplastic resin in the carbon fiber composite material obtained by the step (b) with a metal matrix material.

A method of producing a carbon fiber-nonmetal composite material in one embodiment of the invention includes (c-2) replacing the thermoplastic resin in the carbon fiber composite material obtained by the step (b) with a nonmetal matrix material.

In the step (c-1) or the step (c-2), various forming methods as described below may be employed.

Powder Forming Method

The step (c-1) or the step (c-2) may be performed by powder forming the carbon fiber composite material obtained by the step (b). In more detail, the carbon fiber composite material obtained in the above-described embodiment or freeze-ground particles of the carbon fiber composite material are compressed in a die and fired at the sintering temperature of the dispersing particles (e.g. 550° C. when the dispersing particles are aluminum particles) to obtain a carbon fiber-metal composite material or a carbon fiber-nonmetal composite material.

The powder forming in one embodiment of the invention is the same as powder forming in a metal forming process, and includes powder metallurgy. The powder forming includes not only the case of using a powder raw material, but also the case of using a raw material formed in the shape of a block by compression-preforming the carbon fiber composite material. As the sintering method, a spark plasma sintering (SPS) method using a plasma sintering device, or the like may be employed in addition to a general sintering method.

The carbon fiber composite material and particles of a metal material or a nonmetal material used as the matrix of a carbon fiber-metal composite material or a carbon fiber-nonmetal composite material may be wet-blended and sintered in the same manner as described above to obtain a carbon fiber-metal composite material or a carbon fiber-nonmetal composite material. In this case, it is preferable to mix (wet-blend) the carbon fiber composite material with the particles of the matrix material in a solvent.

Freeze-ground particles of the carbon fiber composite material and particles of a metal material or a nonmetal material used as the matrix may be mixed (e.g. dry-blended), compression-formed in a die, and sintered to obtain a carbon fiber-metal composite material or a carbon fiber-nonmetal composite material.

A carbon fiber-metal composite material or a carbon fiber-nonmetal composite material produced by such powder forming allows the carbon nanofibers to be dispersed in glass. It is preferable that the particles of the metal material or the nonmetal material as the matrix used in the step (c) be formed of a material the same as the material for the dispersing particles used to obtain the carbon fiber composite material. The size of the particles may be arbitrarily selected depending on the application of the composite metal material or the composite nonmetal material obtained by powder forming or the like.

Casting Method

A carbon fiber-metal composite material or a carbon fiber-nonmetal composite material may be cast by mixing the carbon fiber composite material obtained by the step (b) into a molten metal or a molten nonmetal, and casting the mixture in a die having a desired shape.

In the casting step, a metal mold casting method, a diecasting method, or a low-pressure casting method, in which a molten metal or a molten nonmetal is poured into a die made of steel, may be employed. A method classified into a special casting method, such as a high-pressure casting method in which a molten metal is caused to solidify at a high pressure, a thixocasting method in which a molten metal is stirred, or a centrifugal casting method in which a molten metal is cast into a die utilizing centrifugal force, may also be employed.

In these casting methods, a molten metal or a molten nonmetal is caused to solidify in a die in a state in which the carbon fiber composite material is mixed into the molten metal or the molten nonmetal to form a carbon fiber-metal composite material or a carbon fiber-nonmetal composite material. In this casting step, the thermoplastic resin in the carbon fiber composite material is decomposed and removed by heat from the molten metal or the molten nonmetal and is replaced with the molten metal or the molten nonmetal.

The molten metal used in the casting step may be appropriately selected from light metals and light alloys used in a general casting process, such as aluminum and an aluminum alloy, magnesium and a magnesium alloy, and titanium and a titanium alloy, either individually or in combination of two or more, depending on the application.

The molten nonmetal used in the casting step may be appropriately selected from nonmetals used in a general casting process, such as ceramics and glass, either individually or in combination of two or more, depending on the application.

If the metal used as the molten metal is a metal the same as the material for the dispersing particles mixed in advance into the carbon fiber composite material, or is an alloy containing the same metal element as that of the dispersing particles, wettability with the dispersing particles is increased, whereby the strength of the carbon fiber-metal composite material as the resulting product can be increased. The same effect can be achieved when the molten nonmetal is a nonmetal the same as the material for the dispersing particles or contains the same nonmetal element as that of the dispersing particles.

Permeation Method

A casting step in one embodiment of the invention using a pressureless permeation method which causes a molten metal to permeate the carbon fiber composite material is described below in detail with reference to FIGS. 1 and 2.

Figure 2:
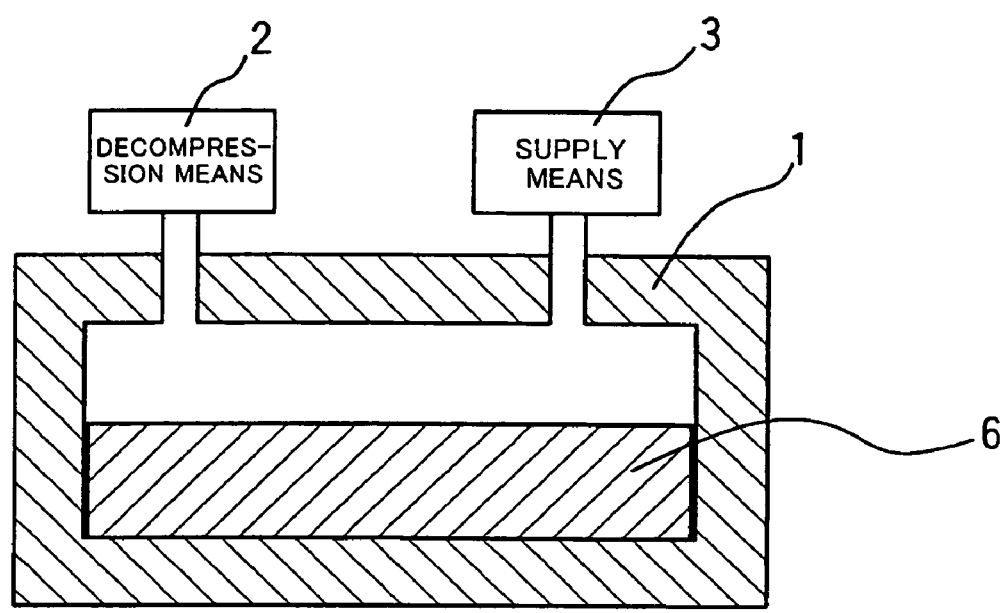
FIG. 2 is a schematic diagram of a device for producing a carbon fiber-metal composite material using a pressureless permeation method.

FIGS. 1 and 2 are schematic configuration diagrams of a device for producing a carbon fiber-metal composite material using the pressureless permeation method. As the carbon fiber composite material obtained in the above-described embodiment, a carbon fiber composite material 4, which is compression-formed in a die having a desired shape such as the shape of the final product, may be used.

In FIG. 2, the carbon fiber composite material 4 (e.g. obtained by mixing dispersing particles 50 and carbon nanofibers 40 into a thermoplastic resin 30) formed in advance is placed in a sealed container 1. A metal ingot or a nonmetal body 5 is disposed above the carbon fiber composite material 4.

The carbon fiber composite material 4 and the metal ingot or the nonmetal body 5 disposed in the container 1 are heated to a temperature equal to or higher than the melting point of the material using heating means (not shown) provided in the container 1. The heated metal ingot or nonmetal body 5 melts into a molten metal or a molten nonmetal. The thermoplastic resin 30 in the carbon fiber composite material 4 which is in contact with the molten metal or the molten nonmetal is decomposed and vaporized, and the molten metal or the molten nonmetal permeates the space formed by decomposition of the thermoplastic resin 30 to replace the thermoplastic resin 30.

In the carbon fiber composite material 4 in this embodiment, the space formed by decomposition of the thermoplastic resin 30 allows the molten metal or the molten nonmetal to more rapidly permeate the entire carbon fiber composite material 4 due to a capillary phenomenon. In the case where the surfaces of the dispersing particles are oxidized, the molten metal or the molten nonmetal permeates the space between the dispersing particles 50, which are reduced and provided with improved wettability, due to the capillary phenomenon, whereby the carbon fiber composite material is entirely filled with the molten metal or the molten nonmetal.

The heating using the heating means of the container 1 is terminated so that the molten metal or the molten nonmetal which has permeated the mixed material 4 is cooled and solidified to obtain a carbon fiber-metal composite material or a carbon fiber-nonmetal composite material 6 in which the carbon nanofibers 40 are uniformly dispersed. The carbon fiber composite material 4 used in the casting step is preferably formed in advance using dispersing particles of the same material as the material for the molten metal or the molten nonmetal used in the casting step. This enables the molten metal or the molten nonmetal and the dispersing particles to be easily mixed, whereby a homogeneous composite material can be obtained.

The atmosphere inside the container 1 may be removed by decompression means 2 such as a vacuum pump connected with the container 1 before heating the container 1. Nitrogen gas may be introduced into the container 1 from inert-gas supply means 3 such as a nitrogen gas cylinder connected with the container 1.

In the case of using aluminum as the dispersing particles and the molten metal, since the surfaces of aluminum particles 42 and the aluminum ingot 5 are covered with oxides, the aluminum particles 42 and the aluminum ingot 5 exhibit poor wettability. However, in one embodiment of the invention, the aluminum particles 42 and the aluminum ingot 5 exhibit excellent wettability. This is because, when causing the aluminum molten metal to permeate the carbon fiber composite material, the molecular terminals of the thermally decomposed thermoplastic resin become radicals so that the oxides (alumina) on the surfaces of the aluminum ingot 5 and the aluminum particles 42 are reduced by these radicals.

Therefore, in one embodiment of the invention, since a reducing atmosphere can be formed even inside the carbon fiber composite material due to decomposition of the thermoplastic resin in the carbon fiber composite material, casting using the pressureless permeation method can be performed without providing a reducing atmosphere processing chamber as in a related-art method. As described above, wettability between the reduced surfaces of the aluminum particles and the permeated aluminum molten metal is improved, whereby a further homogeneously integrated metal material can be obtained.

Moreover, flows due to permeation of the aluminum molten metal cause the carbon nanofibers to enter the aluminum particles. Furthermore, the surfaces of the carbon nanofibers are activated by the radicals of the decomposed thermoplastic resin molecules, whereby wettability with the aluminum molten metal is improved. The carbon fiber-metal composite material thus obtained includes the carbon nanofibers uniformly dispersed in the aluminum matrix. The aluminum molten metal is prevented from being oxidized by performing the casting step in an inert atmosphere, whereby wettability with the aluminum particles is further improved.

The pressureless permeation method is described in the above-described embodiment. However, a pressure permeation method which applies pressure by utilizing the pressure of an atmosphere such as an inert gas may also be used.

Examples of the invention and comparative examples are described below. However, the invention is not limited to the following examples.

EXAMPLES 1 TO 3 AND COMPARATIVE EXAMPLE 1

(1) Preparation of Sample (a) Preparation of Carbon Fiber Composite Material

Step (a): A predetermined amount of a thermoplastic resin pellet (100 parts by weight) shown in Table 1 was supplied to a first hopper of a twin-screw extruder (heating cylinder temperature: 250° C.) to melt the thermoplastic resin.

After the addition of dispersing particles in an amount (parts by weight) shown in Table 1 to the melted thermoplastic resin from a second hopper of the twin-screw extruder, the twin screws were rotated.

Step (b): After the addition of carbon nanofibers ("CNT" in Table 1) in an amount (parts by weight) shown in Table 1 from a third hopper of the twin-screw extruder in which the thermoplastic resin and the dispersing particles were mixed, the twin screws were rotated.

The carbon fiber composite material extruded from an end nozzle of the twin-screw extruder was introduced into a die cooled to room temperature to obtain carbon fiber composite material samples of Examples 1 to 3 formed into a predetermined shape.

A thermoplastic resin sample of Comparative Example 1 was obtained without adding the dispersing particles in the step (a).

Step (c): Preparation of Carbon Fiber-Metal Composite Material

The carbon fiber composite material sample of each of Examples 1 to 3 obtained by (a) was disposed in a container (furnace). After placing an aluminum ingot (metal) above the carbon fiber composite material sample, the carbon fiber composite material sample and the aluminum ingot were heated to the melting point of aluminum in an inert gas (nitrogen) atmosphere. The aluminum ingot melted into an aluminum molten metal, and the molten metal permeated the carbon fiber composite material sample to replace the thermoplastic resin in the carbon fiber composite material sample. After completion of permeation of the aluminum molten metal, the aluminum molten metal was allowed to cool and solidify to obtain a carbon fiber-metal composite material containing the aluminum matrix. The amount of the carbon nanofibers added was adjusted so that the content of the carbon nanofibers in the carbon fiber-metal composite material was 1.6 vol %.

As the dispersing particles of Examples 1 to 3, aluminum particles (average particle diameter: 28 μm) were used. As the carbon nanofibers, carbon nanofibers having an average diameter (fiber diameter) of about 13 nm and an average length of about 25 μm were used.

(2) Measurement Using Pulsed NMR Technique

Each carbon fiber composite material sample was subjected to measurement by the Hahn-echo method using the pulsed NMR technique. The measurement was conducted using "JMN-MU25" manufactured by JEOL, Ltd. The measurement was conducted under conditions of an observing nucleus of $^1$H, a resonance frequency of 25 MHz, and a 90° pulse width of 2 μsec, and a decay curve was determined while changing Pi in the pulse sequence (90°x-Pi-180°x) of the Hahn-echo method. The sample was measured in a state in which the sample was inserted into a sample tube within an appropriate magnetic field range. The measurement temperature was the kneading temperature (250° C.) in the step (b). The first-component spin-spin relaxation time (T2s), the second-component spin-spin relaxation time (T2l), the fraction (fl) of components having the second-component spin-spin relaxation time, and the spin-lattice relaxation time (T1) were determined for the raw material thermoplastic resin and the carbon fiber composite material sample. The first-component spin-spin relaxation time (T2s), the second-component spin-spin relaxation time (T2l), the fraction (fl) of components having the second-component spin-spin relaxation time, and the spin-lattice relaxation time (T1) at the mixing temperature (250° C.) in the step (b) were also determined for the raw material thermoplastic resin. The measurement results are shown in Table 1. The carbon fiber composite material sample of Example 1 had a first-component spin-spin relaxation time (T2s) of 680 μsec, a second-component spin-spin relaxation time (T2l) of 12,000 μsec, and a fraction (fl) of components having the second-component spin-spin relaxation time of 0.12. The first-component spin-spin relaxation time (T2s) of the carbon fiber composite material sample of Example 2 was 430 μsec, and the first-component spin-spin relaxation time (T2s) of the carbon fiber composite material sample of Example 3 was 350 μsec. The second-component spin-spin relaxation time (T2l) was not detected in Examples 2 and 3. Therefore, the fraction (fl) of components having the second-component spin-spin relaxation time was zero.

(3) Measurement of Dynamic Viscoelasticity (E')

The dynamic viscoelasticity (E') of the carbon fiber composite material samples was measured in accordance with JIS K 6521-1993. The measurement results are shown in Table 1.

(4) Observation Using Electron Microscope (SEM)

Table 1 shows electron microscope (SEM) observation results for the carbon fiber composite material samples and the carbon fiber-metal composite material samples of Examples 1 to 3 and Comparative Example 1.

(5) Measurement of Compressive Yield Strength

The compressive yield strength (MPa) of the carbon fiber-metal composite material samples was measured. The 0.2% yield strength (s 0.2) when compressing the sample with dimensions of 10×10×5 mm at 0.01 mm/min was measured as the compressive yield strength.

carbon nanofibers are uniformly dispersed in the carbon fiber composite material according to the example.

This is more clearly understood by comparing Example 1 with Comparative Example 1. Specifically, in Comparative Example 1 in which the dispersing particles are not used, the spin-spin relaxation times (T2s/250° C. and T2l/250° C.) of the carbon fiber composite material sample do not differ to a large extent from those of the raw material thermoplastic resin. On the other hand, in Example 1 of the invention, the spin-spin relaxation times (T2s/250° C. and T2l/250° C.) of the carbon fiber composite material sample are significantly shorter than those of the raw material thermoplastic resin. The same fact was confirmed for the fraction (fl/250° C.).

As is clear from the results for the dynamic viscoelasticity (E'), using the carbon fiber composite material sample, according to Examples 1 to 3 of the invention, it was confirmed that the presence of the carbon nanofibers improves the dynamic viscoelasticity, whereby the reinforcing effect by the carbon nanofibers can be obtained. This is more clearly understood by comparing Examples 1 to 3 with Comparative Example 1.

As a result of electron microscope (SEM) observation of the carbon fiber composite material samples and the carbon fiber-metal composite material samples of Examples 1 to 3 and Comparative Example 1, the dispersion state of the carbon nanofibers was excellent in the samples of Examples 1 to 3, and the dispersion state of the carbon nanofibers was bad in the sample of Comparative Example 1 due to considerable occurrence of aggregation of the carbon nanofibers.

Since the compressive yield strength of the carbon fiber-metal composite material samples of Examples 1 to 3 and

TABLE 1

| | | Example 1 | Example 2 | Example 3 | Comparative Example 1 |
|---|---|---|---|---|---|
| Raw material thermoplastic resin | Thermoplastic resin | ABS | ABS | Polyamide 6 | ABS |
| | Average molecular weight | 150,000 | 150,000 | 120,000 | 150,000 |
| | T2s (μsec)/250° C. | 1000 | 1000 | 800 | 1000 |
| | T2l (μsec)/250° C. | 25000 | 25000 | 12000 | 25000 |
| | fl (μsec)/250° C. | 0.55 | 0.55 | 0.37 | 0.55 |
| | T1 (msec)/250° C. | 880 | 880 | 250 | 880 |
| Mixing ratio | Thermoplastic resin (part by weight) | 100 | 100 | 100 | 100 |
| | Dispersing particles (part by weight) | 20 (Al) | 500 (Al) | 500 (Al) | 0 |
| | CNT (part by weight) | 4 | 10 | 10 | 1.8 |
| Carbon fiber composite material (matrix: thermoplastic resin) | T2s (μsec)/250° C. | 680 | 430 | 350 | 1100 |
| | T2l (μsec)/250° C. | 12000 | — | 0 | 28000 |
| | fl (μsec)/250° C. | 0.12 | 0 | 0 | 0.58 |
| | T1 (msec)/250° C. | 410 | 330 | 100 | 900 |
| | E' (30° C.) (MPa) | 10 | 28 | 67 | 3.2 |
| | CNT dispersion state (SEM observation) | Good | Good | Good | Bad |
| Carbon fiber-metal composite material (matrix: aluminum) | CNT dispersion state (SEM observation) | Good | Good | Good | Bad |
| | Compressive yield strength (MPa) | 50 | 420 | 450 | 65 |
| | (vol % of CNT) | 1.6 | 1.6 | 1.6 | 1.6 |

From the results shown in Table 1, the following items were confirmed according to Examples 1 to 3 of the invention. Specifically, the spin-spin relaxation times at 250° C. (T2s/250° C. and T2l/250° C.) of the carbon fiber composite material sample including the dispersing particles and the carbon nanofibers are shorter than those of the raw material thermoplastic resin which does not include the dispersing particles. The fraction (fl/250° C.) of the carbon fiber composite material sample including the metal particles and the carbon nanofibers is smaller than that of the raw material thermoplastic resin which does not include the dispersing particles and the carbon nanofibers. These results suggest that the Comparative Example 1 is improved, it was confirmed that the carbon nanofibers are uniformly dispersed in the matrix.

From these results, according to the example of the invention, it was confirmed that the carbon nanofibers, which can be generally dispersed in a matrix to only a small extent, are uniformly dispersed in the thermoplastic resin, whereby a carbon fiber-metal composite material in which the carbon nanofibers are uniformly dispersed can be obtained.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A carbon fiber composite material, comprising:
a thermoplastic resin;
carbon nanofibers dispersed in the thermoplastic resin; and
dispersing particles which promote dispersion of the carbon nanofibers in the thermoplastic resin:
wherein:
the carbon fiber composite material has a first-component spin-spin relaxation time (T2s) of from 100 to 1,000 μsec. as measured at 250° C.;
the carbon fiber composite lacks or has a second-component spin-spin relaxation time (T2l);
the fraction of components having the second-component spin-spin relaxation time is less than 0.2, as measured at 250° C. by Hahn-echo method using a pulsed NMR technique with $^1$H as an observing nucleus; and
if the carbon fiber composite has a second-component spin-spin relaxation time (T2l), (T2l) is less than 20,000 μsec.

2. The carbon fiber composite material as defined in claim 1, wherein an amount of the dispersing particles is 1 to 2,000 parts by weight for 100 parts by weight of the thermoplastic resin.

3. The carbon fiber composite material as defined in claim 1, wherein the dispersing particles have an average particle diameter greater than an average diameter of the carbon nanofibers.

4. The carbon fiber composite material as defined in claim 1, wherein the dispersing particles have an average particle diameter of 500 μm or less.

5. The carbon fiber composite material as defined in claim 1, wherein the dispersing particles are metal particles.

6. The carbon fiber composite material as defined in claim 1, wherein the dispersing particles are nonmetal particles.

7. The carbon fiber composite material as defined in claim 5, wherein the metal particles are selected from the group consisting of: aluminum, aluminum alloys, magnesium. magnesium alloys, titanium, and titanium alloys.

8. The carbon fiber composite material as defined in claim 1, wherein the carbon nanofibers have an average diameter of 0.5 to 500 nm.

9. A carbon fiber-metal composite material obtained by replacing the thermoplastic resin in the carbon fiber composite material as defined in claim 1 with a metal matrix material.

10. A carbon fiber-nonmetal composite material obtained by replacing the thermoplastic resin in the carbon fiber composite material as defined in claim 1 with a nonmetal matrix material.

11. A method of producing a carbon fiber composite material, the method comprising:
(a) mixing a thermoplastic resin and dispersing particles which promote dispersion of carbon nanofibers in the thermoplastic resin; and
(b) mixing the carbon nanofibers into the thermoplastic resin including the dispersing particles and dispersing the carbon nanofibers by applying a shear force;
wherein:
the carbon fiber composite material has a first-component spin-spin relaxation time (T2s) of from 100 to 1.000 μsec, as measured at 250° C.;
the carbon fiber composite lacks or has a second-component spin-spin relaxation time (T2l);
the fraction of components having the second-component spin-spin relaxation time is less than 0.2, as measured at 250° C. by Hahn-echo method using a pulsed NMR technique with $^1$H as an observing nucleus; and
if the carbon fiber composite has a second-component spin-spin relaxation time (T2l). (T2l) is less than 20,000 μsec.

12. The method of producing a carbon fiber composite material as defined in claim 11, wherein an amount of the dispersing particles is 1 to 2,000 parts by weight for 100 parts by weight of the thermoplastic resin.

13. The method of producing a carbon fiber composite material as defined in claim 11, wherein the dispersing particles have an average particle diameter greater than an average diameter of the carbon nanofibers.

14. The method of producing a carbon fiber composite material as defined in claim 11, wherein the dispersing particles have an average particle diameter of 500 μm or less.

15. The method of producing a carbon fiber composite material as defined in claim 11, wherein the dispersing particles are metal particles.

16. The method of producing a carbon fiber composite material as defined in claim 11, wherein the dispersing particles are nonmetal particles.

17. The method of producing a carbon fiber composite material as defined in claim 15, wherein the metal particles selected from the group consisting of: aluminum, aluminum alloys, magnesium, magnesium alloys, titanium, and titanium alloys.

18. The method of producing a carbon fiber composite material as defined in claim 11, wherein the thermoplastic resin has a molecular weight of 10,000 to 1,000,000.

19. The method of producing a carbon fiber composite material as defined in claim 11, wherein the thermoplastic resin has a first-component spin-spin relaxation time (T2s) of 100 to 50,000 μsec at a temperature of the step (b), the first-component spin-spin relaxation time being measured by a Hahn-echo method using a pulsed nuclear magnetic resonance (NMR) technique.

20. The method of producing a carbon fiber composite material as defined in claim 11, wherein the thermoplastic resin has a spin-lattice relaxation time (T1) of 10 to 5,000 msec at a temperature of the step (b), the spin-lattice relaxation time being measured by a Hahn-echo method using a pulsed nuclear magnetic resonance technique.

21. The method of producing a carbon fiber composite material as defined in claim 11, wherein the carbon nanofibers have an average diameter of 0.5 to 500 nm.

22. The method of producing a carbon fiber composite material as defined in claim 11, wherein the step (b) is performed by an open-roll method.

23. The method of producing a carbon fiber composite material as defined in claim 11, wherein the step (b) is performed by an internal mixing method.

24. The method of producing a carbon fiber composite material as defined in claim 11, wherein the step (b) is performed by a multi-screw extrusion kneading method.

25. A method of producing a carbon fiber-metal composite material, the method comprising:
(c-1) replacing the thermoplastic resin in the carbon fiber composite material obtained by the method as defined in claim 11, with a metal matrix material.

26. A method of producing a carbon fiber-nonmetal composite material, the method comprising:
(c-2) replacing the thermoplastic resin in the carbon fiber composite material obtained by the method as defined in claim 11, with a nonmetal matrix material.

27. The method of producing a carbon fiber-metal composite material as defined in claim 25, wherein the step (c-1) includes powder forming.

28. The method of producing a carbon fiber-nonmetal composite material as defined in claim 26, wherein the step (c-2) includes powder forming.

29. The method of producing a carbon fiber-metal composite material as defined in claim 25, wherein the step (c-1) includes mixing the carbon fiber composite material into a molten metal and casting the resulting mixture in a die having a desired shape.

30. The method of producing a carbon fiber-nonmetal composite material as defined in claim 26, wherein the step (c-2) includes mixing the carbon fiber composite material into a molten nonmetal and casting the resulting mixture in a die having a desired shape.

31. The method of producing a carbon fiber-metal composite material as defined in claim 25, wherein the step (c-1) includes:
   disposing a metal ingot above the carbon fiber composite material; and
   heating the metal ingot to melt into a molten metal and heating the carbon fiber composite material to vaporize the thermoplastic resin in the carbon fiber composite material, thereby causing the molten metal to permeate the carbon fiber composite material to replace the thermoplastic resin with the molten metal.

32. The method of producing a carbon fiber-nonmetal composite material as defined in claim 26, wherein the step (c-2) includes:
   disposing a nonmetal body above the carbon fiber composite material; and
   heating the nonmetal body to melt into a molten nonmetal and heating the carbon fiber composite material to vaporize the thermoplastic resin in the carbon fiber composite material, thereby causing the molten nonmetal to permeate the carbon fiber composite material to replace the thermoplastic resin with the molten nonmetal.

33. The method of producing a carbon fiber-metal composite material as defined in claim 25, wherein the matrix material is a material the same as a material for the dispersing particles.

34. The method of producing a carbon fiber-nonmetal composite material as defined in claim 26, wherein the matrix material is a material the same as a material for the dispersing particles.

35. A carbon fiber composite material formed by the method as defined in claim 11.

36. A carbon fiber-metal composite material formed by the method as defined in claim 25.

37. A carbon fiber-nonmetal composite material formed by the method as defined in claim 26.

* * * * *